(12) United States Patent
Page

(10) Patent No.: US 12,654,835 B2
(45) Date of Patent: Jun. 16, 2026

(54) DRY FIBER CONSTRUCTION OF A BLENDED WING BODY AIRCRAFT AND METHOD OF MANUFACTURE

(71) Applicant: JETZERO, INC., Long Beach, CA (US)

(72) Inventor: Mark Allan Page, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/243,276

(22) Filed: Sep. 7, 2023

(65) Prior Publication Data

US 2025/0083791 A1 Mar. 13, 2025

(51) Int. Cl.
*B64C 1/06* (2006.01)
*B32B 5/06* (2006.01)
(Continued)

(52) U.S. Cl.
CPC ................ *B64C 1/06* (2013.01); *B32B 5/073* (2021.05); *B32B 5/12* (2013.01); *B32B 7/12* (2013.01); *B32B 37/12* (2013.01); *B32B 37/18* (2013.01); *B64C 39/10* (2013.01); *B64F 5/10* (2017.01); *B32B 2250/20* (2013.01); *B32B 2260/023* (2013.01); *B32B 2260/046* (2013.01); *B32B 2262/106* (2013.01); *B32B 2305/076* (2013.01);
(Continued)

(58) Field of Classification Search
CPC ...... B64C 2001/0072; B64C 2039/105; B32B 5/073
See application file for complete search history.

(56) References Cited

U.S. PATENT DOCUMENTS

| | | | |
|---|---|---|---|
| 2,650,780 A | 9/1953 | Northrop et al. | |
| 2,714,226 A | 8/1955 | Axelrad | |
| | (Continued) | | |

FOREIGN PATENT DOCUMENTS

| | | | |
|---|---|---|---|
| EP | 2591996 A1 | 5/2013 | |
| EP | 3266597 A1 | 1/2018 | |
| FR | 3048226 B1 | 7/2019 | |

OTHER PUBLICATIONS

George, Hybrid carbon fiber composite lattice truss structures, (Journal), Jun. 22, 2014, Composites Part A: Applied Science and Manufacturing, vol. 65, Oct. 2014, p. 135-147.
(Continued)

*Primary Examiner* — William L Gmoser
(74) *Attorney, Agent, or Firm* — Jeffrey Schox

(57) ABSTRACT

A blended wing body (BWB) aircraft comprising a first composite part comprising, a first dry carbon fiber sheet having a width greater than 3 inches and comprising a first layer comprising dry carbon fibers, a second layer disposed on top of the first layer comprising dry carbon fibers, a stitching extending through the first dry carbon fiber sheet, wherein the stitching is configured to bind the first dry carbon fiber sheet together, and a resin matrix, wherein the stitching and the first dry carbon fiber sheet are embedded within the resin matrix to create a single unified structure. BWB aircraft further comprises a blended wing body, having no clear demarcation along a leading edge of the BWB aircraft from a wing to a nose of the blended wing body, and wherein the first composite part comprises a portion of the blended wing body.

20 Claims, 6 Drawing Sheets

(51) Int. Cl.

| | |
|---|---|
| *B32B 5/12* | (2006.01) |
| *B32B 7/12* | (2006.01) |
| *B32B 37/12* | (2006.01) |
| *B32B 37/18* | (2006.01) |
| *B64C 1/00* | (2006.01) |
| *B64C 39/10* | (2006.01) |
| *B64F 5/10* | (2017.01) |

(52) U.S. Cl.
CPC ... *B32B 2605/18* (2013.01); *B64C 2001/0072* (2013.01); *B64C 2039/105* (2013.01)

(56) References Cited

U.S. PATENT DOCUMENTS

| | | | |
|---|---|---|---|
| 3,743,236 A | 7/1973 | Schwenk et al. | |
| 3,987,144 A | 10/1976 | Nickold | |
| 4,198,018 A | 4/1980 | Brault | |
| 4,531,704 A | 7/1985 | Matthei | |
| 4,736,910 A | 4/1988 | Oquinn et al. | |
| 4,863,330 A | 9/1989 | Olez et al. | |
| 5,639,405 A | 6/1997 | Erikson | |
| 5,639,416 A | 6/1997 | Pennisi et al. | |
| 5,651,932 A | 7/1997 | Butler | |
| 5,662,946 A | 9/1997 | Pratt et al. | |
| 5,667,191 A | 9/1997 | Nemoto | |
| 5,783,133 A | 7/1998 | Hara et al. | |
| 5,866,272 A * | 2/1999 | Westre | B64C 30/00 |
| | | | 244/119 |
| 5,902,535 A | 5/1999 | Burgess et al. | |
| 5,909,858 A | 6/1999 | Hawley | |
| 6,065,720 A | 5/2000 | Ash et al. | |
| 6,070,831 A | 6/2000 | Vassiliev et al. | |
| 6,165,407 A | 12/2000 | Tahara et al. | |
| 6,450,450 B1 | 9/2002 | Macdonald et al. | |
| 6,568,632 B2 | 5/2003 | Page et al. | |
| 6,595,466 B2 | 7/2003 | Depeige et al. | |
| 6,620,484 B1 * | 9/2003 | Bolukbasi | B64C 1/062 |
| | | | 244/119 |
| 6,708,924 B2 | 3/2004 | Page et al. | |
| 6,896,841 B2 | 5/2005 | Velicki et al. | |
| 6,926,235 B2 | 8/2005 | Ouellette et al. | |
| 7,419,627 B2 | 9/2008 | Sheu et al. | |
| 7,570,274 B2 | 8/2009 | Humphries | |
| 7,758,800 B2 | 7/2010 | Cicci et al. | |
| 8,293,165 B2 | 10/2012 | Kurihara et al. | |
| 8,317,130 B1 * | 11/2012 | Westman | B64U 20/65 |
| | | | 244/102 R |
| 8,523,110 B2 * | 9/2013 | Schwinning | B64C 1/1407 |
| | | | 244/119 |
| 8,608,109 B2 | 12/2013 | Campbell | |
| 8,703,269 B2 | 4/2014 | Reighley et al. | |
| 8,870,117 B2 | 10/2014 | Muoz et al. | |
| 9,051,062 B1 * | 6/2015 | Boone | B29C 66/73751 |
| 9,317,626 B2 | 4/2016 | Chan | |
| 9,393,743 B2 | 7/2016 | Kraemer | |
| 9,427,934 B2 | 8/2016 | Tsuchiya | |
| 9,463,864 B1 * | 10/2016 | McCarville | B64C 1/00 |
| 9,649,820 B1 * | 5/2017 | Boone | B64C 1/061 |
| 9,694,898 B2 | 7/2017 | Aitken et al. | |
| 9,695,533 B2 * | 7/2017 | Beraud | B29B 11/16 |
| 9,776,704 B1 * | 10/2017 | Rufino | B29C 70/384 |
| 10,167,081 B2 | 1/2019 | Gallant et al. | |
| 10,407,151 B2 | 9/2019 | Cazals et al. | |
| 10,730,252 B2 | 8/2020 | Cantwell et al. | |
| 10,843,783 B1 | 11/2020 | Cranston et al. | |
| 10,899,451 B2 | 1/2021 | Saint-marc et al. | |
| 10,988,232 B2 | 4/2021 | Crawford | |
| 11,124,283 B1 | 9/2021 | Kennedy | |
| 11,453,483 B2 | 9/2022 | Page | |
| 11,511,854 B2 | 11/2022 | Baity et al. | |
| 11,541,576 B1 | 1/2023 | Page | |
| 11,613,356 B2 | 3/2023 | Banerjee et al. | |
| 11,952,097 B1 | 4/2024 | Page | |
| 12,122,501 B1 | 10/2024 | Page | |
| 12,246,830 B1 | 3/2025 | Page et al. | |
| 12,263,664 B2 | 4/2025 | Page | |
| 12,415,303 B2 | 9/2025 | Kraemer | |
| 2002/0037389 A1 | 3/2002 | Miyano et al. | |
| 2003/0122272 A1 | 7/2003 | Smith et al. | |
| 2004/0130072 A1 | 7/2004 | Sekido et al. | |
| 2004/0145080 A1 | 7/2004 | Tanaka | |
| 2004/0217234 A1 | 11/2004 | Jones et al. | |
| 2004/0227393 A1 | 11/2004 | Meggiolan | |
| 2009/0057487 A1 | 3/2009 | Velicki et al. | |
| 2009/0136734 A1 | 5/2009 | Berkel et al. | |
| 2010/0155981 A1 | 6/2010 | Miyabe et al. | |
| 2010/0233424 A1 * | 9/2010 | Dan-Jumbo | B32B 1/00 |
| | | | 428/113 |
| 2010/0323181 A1 | 12/2010 | Nutt | |
| 2011/0039057 A1 * | 2/2011 | Frisch | B29C 70/226 |
| | | | 156/154 |
| 2011/0045232 A1 | 2/2011 | Kismarton | |
| 2011/0121130 A1 | 5/2011 | Odle et al. | |
| 2012/0091257 A1 | 4/2012 | Wolff et al. | |
| 2012/0097323 A1 | 4/2012 | Nitsch | |
| 2012/0242004 A1 | 9/2012 | Smith | |
| 2013/0099405 A1 | 4/2013 | Kraemer | |
| 2013/0277886 A1 | 10/2013 | Fujiwara et al. | |
| 2013/0294901 A1 | 11/2013 | Mironets et al. | |
| 2013/0328236 A1 | 12/2013 | Yamamoto et al. | |
| 2014/0284431 A1 * | 9/2014 | Grankaell | B64C 3/20 |
| | | | 428/161 |
| 2014/0335219 A1 | 11/2014 | Altonen | |
| 2016/0229102 A1 | 8/2016 | Galati | |
| 2017/0100894 A1 | 4/2017 | Lauren et al. | |
| 2017/0129194 A1 | 5/2017 | Cinquin | |
| 2017/0180212 A1 | 6/2017 | Fischer et al. | |
| 2017/0183078 A1 | 6/2017 | Cazals et al. | |
| 2017/0284521 A1 | 10/2017 | Sorimoto | |
| 2018/0001999 A1 | 1/2018 | Page | |
| 2018/0057136 A1 | 3/2018 | Haley et al. | |
| 2018/0065286 A1 | 3/2018 | Pruitt et al. | |
| 2018/0169930 A1 | 6/2018 | Tsotsis | |
| 2018/0334254 A1 | 11/2018 | Saint-marc et al. | |
| 2018/0370163 A1 | 12/2018 | Belisle et al. | |
| 2019/0135424 A1 | 5/2019 | Baity et al. | |
| 2019/0152169 A1 | 5/2019 | Volpato et al. | |
| 2019/0161185 A1 | 5/2019 | Woodworth et al. | |
| 2019/0185131 A1 * | 6/2019 | Pina Lopez | B64U 20/65 |
| 2019/0193147 A1 | 6/2019 | Navarro TeixidÓ | |
| 2019/0374868 A1 | 12/2019 | Russell | |
| 2020/0115031 A1 | 4/2020 | Evans et al. | |
| 2020/0172236 A1 | 6/2020 | George | |
| 2020/0180717 A1 | 6/2020 | Bigolin et al. | |
| 2020/0180760 A1 | 6/2020 | Samuel et al. | |
| 2020/0207463 A1 | 7/2020 | Schuster et al. | |
| 2020/0207476 A1 | 7/2020 | Whitlock et al. | |
| 2020/0223355 A1 | 7/2020 | Okell et al. | |
| 2020/0247071 A1 | 8/2020 | Adachi et al. | |
| 2020/0282694 A1 * | 9/2020 | Sanders | B64C 1/064 |
| 2021/0155336 A1 | 5/2021 | Wadsworth | |
| 2021/0179249 A1 | 6/2021 | Mclaughlin et al. | |
| 2021/0179256 A1 * | 6/2021 | Desjoyeaux | D04H 3/115 |
| 2021/0197965 A1 | 7/2021 | Kunz et al. | |
| 2021/0253246 A1 | 8/2021 | Tibbitts et al. | |
| 2021/0269150 A1 | 9/2021 | Xiong et al. | |
| 2021/0309819 A1 | 10/2021 | Yamane et al. | |
| 2022/0001974 A1 * | 1/2022 | Page | B64D 9/00 |
| 2022/0033055 A1 * | 2/2022 | Behzadpour | B64C 1/12 |
| 2022/0080631 A1 | 3/2022 | Suzuki et al. | |
| 2022/0194028 A1 | 6/2022 | Schubert et al. | |
| 2022/0258853 A1 | 8/2022 | Linde et al. | |
| 2022/0355932 A1 | 11/2022 | Abramov et al. | |
| 2022/0388633 A1 | 12/2022 | Kraemer | |
| 2023/0092771 A1 | 3/2023 | Page | |
| 2023/0211245 A1 | 7/2023 | Feng et al. | |
| 2023/0272957 A1 | 8/2023 | Mattson et al. | |
| 2023/0348036 A1 | 11/2023 | Page | |
| 2023/0348057 A1 | 11/2023 | Kawai et al. | |

(56)　　　　　　References Cited

U.S. PATENT DOCUMENTS

| | | |
|---|---|---|
| 2023/0348091 A1 | 11/2023 | Kawai et al. |
| 2024/0294244 A1 | 9/2024 | Page |

OTHER PUBLICATIONS

Page, et al., "Single-Aisle Airliner Disruption With a Single-Deck Blended-Wingbody", 31st Congress of the International Council of the Aeronautical Sciences Belo Horizonte, Brazil, Sep. 9-14, 2018.

Van Der Voet, et al., "Configuration of the Multibubble Pressure Cabin in Blended Wing Body Aircraft", Journal of Aircraft, vol. 49, No. 4, Jul.-Aug. 2012.

Abusrea, et al., "Bending strength of CFRP laminated adhesive joints fabricated by vacuum-assisted resin transfer molding", Composites Part B: Engineering vol. 156; pp. 8-16; https://www.sciencedirect.com/science/article/abs/pii/S135983681830941, Jan. 1, 2019.

Jegley, et al., "Development of the PRSEUS Multi-Bay Pressure Box for a Hybrid Wing Body Vehicle", 56th AIAA/ASCEHS/ASC Structures, Structural Dynamics, and Materials Conference, Jan. 2, 2015.

Kraemer, Dirk, "Systems and Methods for Carrying out a Resin Transfer Molding Process With Multiple Injection Technology", Co-pending U.S. Appl. No. 19/012,082, filed Jan. 7, 2025.

Velicki, et al., "Advanced Structural Concept Development Using Stitched Composites", 49th AIAA/ASME/ASCE/AHS/ASC Structures, Structural Dynamics, and Materials Conference; https://doi.org/10.2514/6.2008-2329, Apr. 7, 2008.

* cited by examiner

DRY FIBER CONSTRUCTION OF A BLENDED WING BODY AIRCRAFT AND METHOD OF MANUFACTURE

FIELD OF THE INVENTION

The present invention generally relates to the field of aviation. In particular, the present invention is directed to an aircraft having carbon fiber material and a method of manufacture.

BACKGROUND

Conventional aircraft typically contain one or more structural components made of aluminum or an aluminum mixture. Conventional aircraft typically do not utilize composites for the structural components of the aircraft due to issues with delamination and issues with binding.

SUMMARY OF THE DISCLOSURE

In an aspect a blended wing body aircraft is described. The Blended wing body aircraft includes a first composite part. The first composite part includes a first dry carbon fiber sheet having a width greater than 3 inches, the first dry carbon fiber sheet having a first layer including a first plurality of dry carbon fibers positioned in a first direction, a second layer including a second plurality of dry carbon fibers positioned in a second direction, wherein the second layer is disposed on top of the first layer. The first composite part further includes at least one stitching extending through the first dry carbon fiber sheet, wherein the at least one stitching is configured to bind the first dry carbon fiber sheet together. The first composite part further includes a resin matrix, wherein the stitching and the first dry carbon fiber sheet are embedded within the resin matrix to create a single unified structure. The blended wing body aircraft further includes a blended wing body, wherein the blended wing body has no clear demarcation along a leading edge of the blended wing body from a wing to a nose of the blended wing body, and wherein the first composite part comprises a portion of the blended wing body.

In another aspect a method of manufacture for a blended wing body aircraft is described. The method includes producing a first composite part. Producing first composite part includes forming a first dry carbon fiber sheet including placing a first layer having a first plurality of dry carbon fibers in a first direction and placing a second layer comprising a second plurality of dry carbon fibers on top of the first layer and in a second direction. Producing first composite part further includes binding the first dry carbon fiber sheet together with at least one stitching, wherein the at least one stitching extends through the first dry carbon fiber sheet, and molding, using a resin, the first dry carbon fiber sheet, wherein the stitching and the first dry carbon fiber sheet are embedded within the resin to create a single unified structure. The method further includes receiving a blended wing body, wherein the blended wing body has no clear demarcation along a leading edge of the blended wing body from a wing to a nose of the blended wing body, and wherein the first composite part comprises a portion of the blended wing body.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for an aircraft with a first composite part having a blended wing body. In an embodiment, aircraft may include a blended wing body and a first composite part wherein the first composite part includes a dry carbon fiber sheet, stitching and a resin matrix.

Aspects of the present disclosure can be used to provide carbon fiber material with a similar material property suitable for flight. Aspects of the present disclosure can also be used to minimize fuel consumption of an aircraft. This is so, at least in part, because carbon fiber material is lighter than conventional materials suitable for aircraft travel.

Aspects of the present disclosure allow for use of blended wing body aircraft technology for air travel, by utilizing carbon fiber material to contain a pressure vessel. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper," "lower," "left," "rear," "right," "front," "vertical," "horizontal," and derivatives thereof relate to embodiments oriented as shown for exemplary purposes in FIG. 4. Furthermore, there is no intention to be bound by any expressed or implied theory presented in this disclosure.

Figure 1:
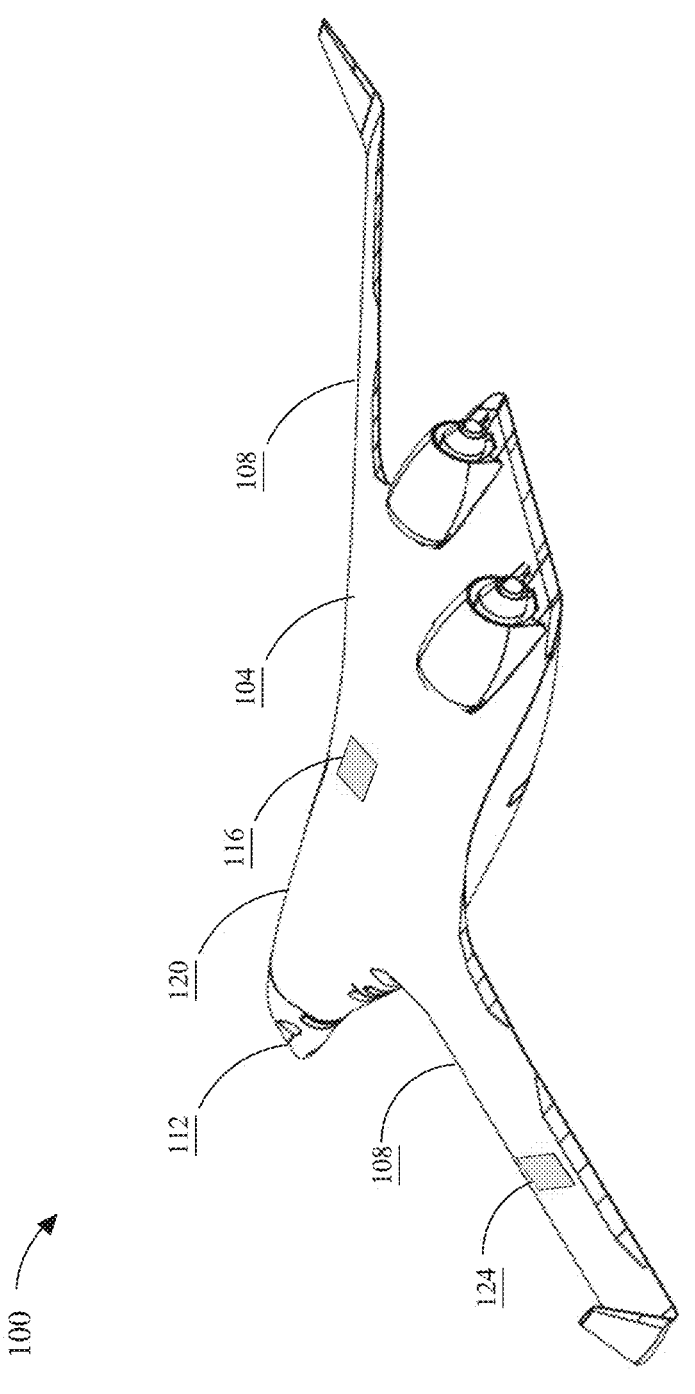
FIG. 1 illustrates a schematic of an exemplary blended wing body aircraft with a first composite part.

Referring now to FIG. 1, an exemplary embodiment of a blended wing body aircraft 100 is illustrated. Aircraft includes a blended wing body having a main body 104 and wings 108. A "blended wing body" (BWB), also known as a "blended body" or a "hybrid wing body" (HWB), is a fixed-wing aircraft body having no clear or abrupt demarcation along a leading edge of the blended wing body from the wing 108 to the nose 112 of the blended wing body.

With continued reference to FIG. 1, BWB aircraft 100 includes a first composite part 116. A "composite part" for the purposes of this disclosure is a component having two or more materials that is related to a structure of BWB aircraft 100. For example, first composite part 116 may include a skin of BWB aircraft 100, a portion of a fuselage of the BWB aircraft 100, and the like. In some cases, first composite part 116 may include a reinforcement material and a matrix for the reinforcement material. The reinforcement material may include carbon fibers, Kevlar, and any other material suitable for aircraft structures. The matrix may include an epoxy and/or any other binding agent configured to contain the reinforcement material.

Figure 2:
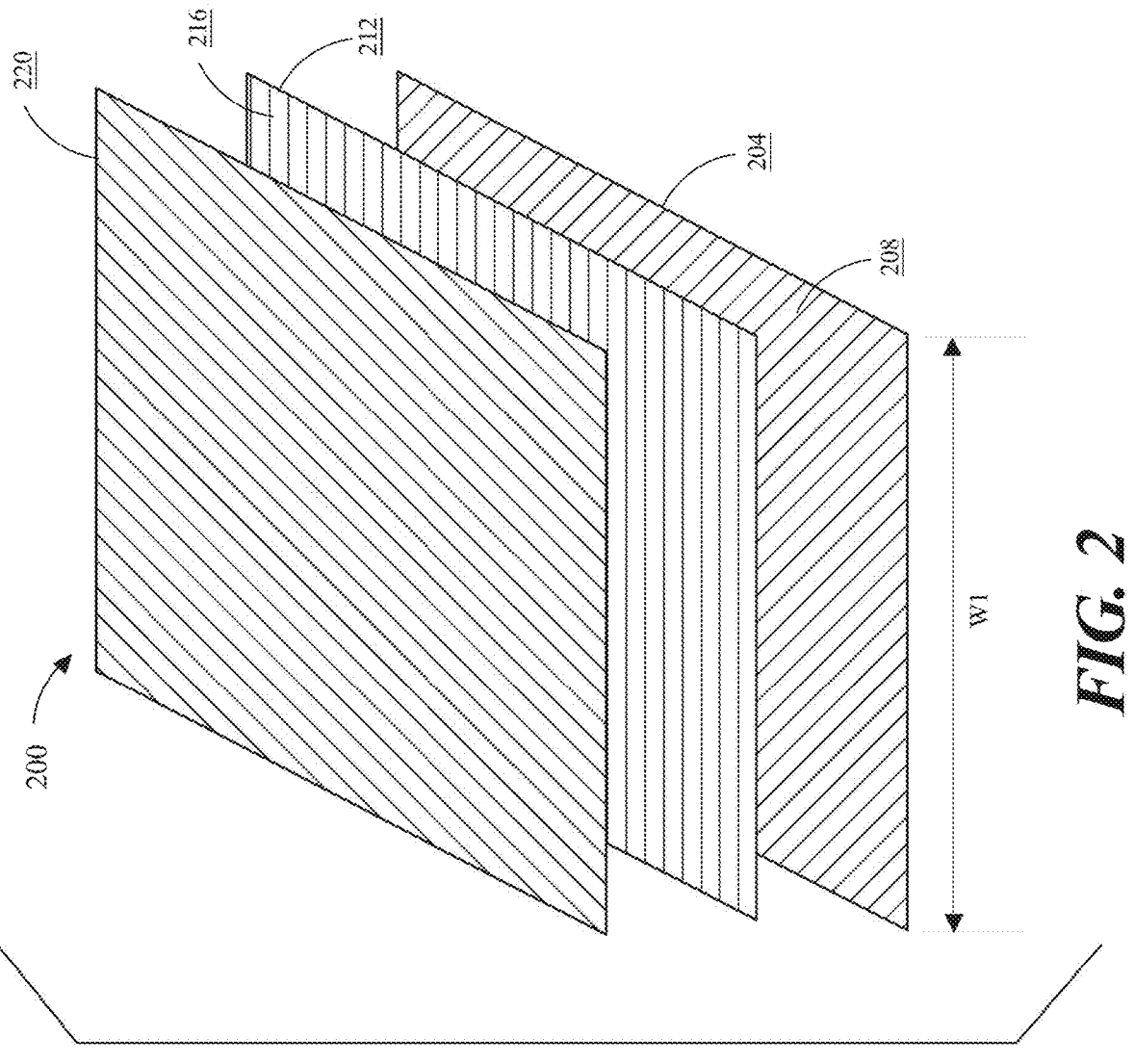
FIG. 2 is an exploded view of an exemplary first dry carbon fiber sheet.

Referring now to FIG. 2, an exemplary embodiment of a first dry carbon fiber sheet 200 is described. First composite part 116 includes the first dry carbon fiber sheet 200. A "carbon fiber sheet" for the purposes of this disclosure is one or more layers of a carbon fiber material that are stacked upon each other. For example, carbon fiber sheet may include multiple layers wherein each layer includes carbon fiber strands, portions of carbon fiber strands, composites comprising carbon fiber strands and the like. In some cases, carbon fiber sheet may include one or more layers, wherein each layer may include a plurality of carbon fiber strands. In some cases, each layer may include a thin sheet of carbon fiber material, bundles of carbon fibers, a sheet consisting of woven carbon fiber strands, a sheet carbon fiber strands bound together with an adhesive such as a glue, epoxy and/or stitching and any other variation of carbon fiber material. First dry carbon fiber sheet 200 may be consistent with carbon fiber sheet. The carbon fiber strands within first dry carbon fiber sheet 200 may be spooled using carbon fibers. In some cases, each layer may include a composite material. A "composite material" as described in this disclosure refers to a material which is produced from two or more materials. For example, a composite material may include a plurality of carbon fiber strands spooled with another material, wherein the other material may be configured to provide strength to the carbon strands and/or act as a binding agent to contains the carbon fibers within the strands. In some cases, each layer may include a carbon fiber lamina. A "lamina" for the purposes of this disclosure is a thin layer of material. For example, a lamina may be a thin layer of the composite material mentioned above. In some embodiments, each layer may include a carbon fiber lamina, the carbon fiber lamina having a plurality of carbon fiber strands. In some cases, carbon fiber sheet may contain one or more layers, wherein each layer includes a plurality of carbon fibers. In some cases, each layer may include a plurality of dry carbon fibers. "Dry carbon fiber," for the purposes of this disclosure, is carbon fiber that has not been coated or impregnated with resin. In some cases, layers within carbon fiber sheet may contain differing materials, orientations and the like. For example, a top layer may contain a plurality of carbon fiber strands orientated in a first direction and a middle layer may contain a plurality of carbon fiber strands orientated in a differing second direction. In some cases, the top layer may include a composite material and/or a differing material as the middle layer. In some cases, carbon fiber sheet may include a quasi-isotropic layup. A "quasi-isotropic layup" as described in this disclosure is when the orientation of the one or more layers are balanced such that there is a constant strength and stiffness of the carbon fiber sheet regardless of the direction in which a force is applied. For example, carbon fiber sheet may include four layers oriented at angles of 0°/−45°/+45°/90°, wherein the orientation of angles provides for a similar strength in multiple directions.

With continued reference to FIG. 2, the first dry carbon fiber sheet 200 includes a width W1 greater than 3 inches. In some cases, each layer within the first dry carbon fiber sheet 200 may include a width W1 of at least 3 inches. In some cases, the dimensions of each layer within the first dry carbon fiber sheet 200 are substantially similar such that width W1 of the top layer may be substantially similar to a width of a bottom layer. In some cases, the width W1 of the first dry carbon fiber sheet 200 and any corresponding layers within the first dry carbon fiber sheet 200 may be substantially similar. In some cases, the first dry carbon fiber sheet 200 may include a width of at least 10 inches. In some cases, the first dry carbon sheet may include a width of at least, 3, 6, 12, 24 and/or 36 inches. In some cases, the first dry carbon fiber sheet 200 may include a width of at least 200 inches. In some cases, the first dry carbon fiber sheet 200 may include a width of at least 50 inches. In some cases, the first dry carbon fiber sheet 200 may include a width of 100 inches or greater. In some cases, at least one carbon fiber strand within the first dry carbon fiber sheet 200 may include a length substantially similar to the width of the first dry carbon fiber sheet 200. In some cases, individual layers within the first dry carbon fiber sheet 200 may contain a width less than that of the width of first dry carbon fiber sheet 200. In some cases, the first dry carbon fiber sheet 200 may contain more than one top layers, wherein the more than one top layers combine to create a single width of carbon fiber sheet. In some cases, first dry carbon fiber sheet 200 may include multiple layers oriented relative to one another wherein width of first dry carbon fiber sheet 200 may consist of the sum of the width of multiple layers.

With continued reference to FIG. 2, in some cases, first dry carbon fiber sheet 200 may include a thickness. The thickness may be defined as a result of multiple layers stacked upon one another. For example, a thickness of a top layer and a thickness of a middle layer may provide for an overall thickness of first dry carbon fiber sheet 200. The first dry carbon fiber sheet 200 may include multiple layers laid onto of one another wherein the combination of the multiple layers may result in a resulting overall thickness. For example, the first dry carbon fiber sheet 200 may include 10 layers wherein each layer may include a thickness of 0.001 inches wherein the combination of layers may result in a carbon fiber sheet consisting of 0.010 inches. In some cases, layers within carbon fiber material may contain differing thicknesses. For example, a top layer may contain a thickness of 0.001 inches whereas a second layer 212 may consist of 0.002 inches. In some cases, the resulting thickness of the first dry carbon fiber sheet 200 may include a resulting thickness of 0.007 inches and/or 2 millimeters. In some cases, the thickness of the first dry carbon fiber sheet 200 may include an overall thickness ranging from 0.050 inches to 1 inch.

With continued reference to FIG. 2, the first dry carbon fiber sheet 200 includes a first layer 204. The first layer 204 may be consistent with any layer described in this disclosure. First layer 204 includes a first plurality of dry carbon fibers 208 positioned in a first direction. First plurality of dry carbon fibers 208 may be consistent with any dry carbon fibers mentioned within this disclosure. In some cases, the first plurality of carbon fibers may include more than one carbon fiber strands oriented in a similar direction. For example a first strand within the first plurality of carbon fibers may be parallel to a second strand within first plurality of carbon fibers. In some cases, a first dry carbon fiber within first plurality of carbon fiber is situated non-parallel to a second dry carbon fiber of the first plurality of dry carbon fibers 208. In some cases, the first plurality of dry carbon fibers 208 may be unidirectional wherein each fiber within the first plurality of carbon fibers are parallel to one another. "Unidirectional" for the purposes of this disclosure refers to a layer wherein each fiber within the layer run in a single parallel direction. In some cases, the first plurality of dry carbon fibers 208 may be bidirectional. "Bidirectional" for the purposes of this disclosure refers to a layer wherein each fiber within the layer runs in either one of two directions. For example, one or more fibers within the first plurality of dry carbon fibers 208 may be non-parallel to one or more fibers within first plurality of dry carbon fibers 208. In some cases, a first portion of dry carbon fibers within first plurality of dry carbon fibers 208 may be orthogonal to a second portion of dry carbon fibers, wherein a portion is one or more dry carbon fiber. In some cases, first layer 204 may include a woven material wherein a portion of dry carbon fibers within first plurality of dry carbon fibers 208 may be interlaced as to form a fabric. In some cases, the portion of dry carbon fibers may be woven and/or interlaced orthogonally to a second portion of dry carbon fibers within first plurality of dry carbon fibers 208.

With continued reference to FIG. 2, first plurality of dry carbon fibers 208 may be positioned in a first direction relative to first dry carbon fiber sheet 200. In some cases, first plurality of dry carbon fibers 208 may be positioned relative to first dry carbon fiber sheet 200 wherein a direction along W1 may indicate an orientation of 0 degrees relative to first carbon fiber sheet 200 and any other varying direction may indicate a non-zero orientation. The first direction may include any orientation of 0-90 degrees. In some cases, the first plurality of dry carbon fibers 208 may be positioned in a first direction relative to a second layer 212. In some cases, the first plurality of dry carbon fibers 208 may be positioned in any angle relative to another layer.

With continued reference to FIG. 2, the first dry carbon fiber sheet 200 includes second layer 212 having a second plurality of dry carbon fibers 216 positioned in a second direction. Second layer 212 may be consistent with first layer 204. In some cases, the second layer 212 may include a differing material in comparison to first layer 204, differing orientation of fibers in comparison to first layer 204, and the like. For example, the first plurality of dry carbon fibers 208 may be bidirectional wherein second layer 212 may be unidirectional. In some cases, the first layer 204 may include a woven material whereas the second layer 212 may contain a nonwoven material. In some cases, the second layer 212 may contain a differing width, thickness, and length in comparison to the first layer 204. In some cases, a second plurality of dry carbon fibers 216 may be oriented in a second direction wherein the second direction differs from the first direction. For example, the second plurality of dry carbon fibers 216 may be oriented at a 90-degree angle whereas first plurality of dry carbon fibers 208 may be oriented at a 0-degree angle. In some cases, first direction and second direction may be similar.

With continued reference to FIG. 2, second layer 212 is disposed on top of first layer 204. In some cases, second layer 212 may be disposed on top of first layer 204 such that a surface area of second layer 212 is substantially in contact with first layer 204. In some cases, second layer 212 is disposed on top of first layer 204 such that second layer 212 is stacked upon first layer 204. In some cases, second layer 212 may be stacked upon first layer 204 such that the width of second layer 212 and the width of first dry carbon fiber sheet 200 may be substantially similar. In some cases, first layer 204, second layer 212 and first dry carbon fiber sheet 200 contain a substantially similar thickness. In some cases, a portion of second layer 212 may be stacked upon a portion of first layer 204.

With continued reference to FIG. 2, first dry carbon fiber sheet 200 may include more than two layers. for example, first carbon fibers sheet may include a third layer 220. In some cases, first dry carbon fiber sheet 200 may include more than three layers. In some cases, first dry carbon fiber sheet 200 may contain 10 or more layers wherein each layer may be consistent with first layer 204, second layer 212 and any other layers described within this disclosure.

Figure 3:
FIG. 3 is a side view of an exemplary first composite part.

Referring now to FIG. 3, an exemplary embodiment of a first composite part 300 is illustrated. First composite part 300 contains at least one stitching 304 extending through first dry carbon fiber sheet 200. "Stitching" for the purposes of this disclosure refers to a material configured to extend through two or more materials and bind the two or more materials togethers. Stitching 304 may include any thread that may be configured to bind two or more materials together. Stitching 304 may include any material, such as but not limited to, carbon fiber, poly-fiber, polyester, Kevlar, aramid and/or a thermoplastic. In some cases, BWB aircraft 100 may include multiple stitching 304, wherein each stitching 304 may include similar or differing materials. In some cases, stitching 304 may include any material suitable for binding layers within first dry carbon fiber sheet 200 together. In some cases, stitching 304 is configured to bind first dry carbon fiber sheet 200 together such that layers within first dry carbon fiber sheet 200 are bound to one another. In some embodiments, stitching 304 may provide delamination resistance and improve damage tolerance of a composite material such as first dry carbon fiber sheet 200. In some cases, stitching 304 may extend through first dry carbon fiber sheet 200 wherein stitching 304 extends through the thickness of each layer of first dry carbon fiber sheet 200. In some cases, stitching 304 may provide for through-thickness reinforcement. In some cases, the through thickness reinforcement may prevent delamination and/or contain delamination within a particular area. In some cases, stitching 304 may contain delamination within a particular area, wherein a composite material such as first dry carbon fiber sheet 200 may not delaminate past a stitching 304. In some cases, delamination may occur wherein a carbon fiber material such as first dry carbon fiber sheet 200 is bonded to a structure.

With continued reference to FIG. 3, the effect of stitching 304 on first dry carbon fiber sheet 200 may be affected by parameters such as the stitch density, the stitch material, the thread density and the like. Stitch density as described in this disclosure refers to the number of stitches over a given area. A higher stitch density may minimize possibilities of delamination within first dry carbon fiber sheet 200. Thread density as described herein refers to the density of the thread used for stitching 304. In some cases, stitching 304 may be sown into first dry carbon fiber sheet 200 such that layers within first dry carbon fiber sheet 200 are bound together. In some cases, the stitching 304 extending through the first dry carbon fiber sheet 200 includes a stitching 304 style such a lock stitch or a modified lock stitch. A "lock stitch" for the purposes of this disclosure is a type of stitching process used in which two threads penetrate a material and interlock primarily within the material. A "modified lock stitch" for the purposes of this disclosure is stitching process in which two threads on opposing surfaces of a material interlock at one surface of the material. In a lock stitch, a top thread and a bottom thread penetrate a material and interlock within the material (ideally within the center of the material) thereby binding the material. In a modified lock stitch, the top thread and bottom thread interlock with each other at an edge of the material, such as at the top or at the bottom of the material. In some cases, a lock stitch and/or a modified lock stitch may prevent unraveling of a stitching 304 within first dry carbon fiber sheet 200. For example, a rip or unraveling of a stitching 304 within a particular area of first dry carbon fiber sheet 200 may be contained as the locks created by the interlocking of the top thread and bottom thread prevent the rip or unraveling of the stitching 304 from spreading. In both lock stitching 304 and modified lock stitching 304 a needle penetrates a first thread through the material and a hook catches the first thread and loops it around a second thread. The hook is sometimes referred to as the bobbin. In a modified lock stitch, the tension of the needle and/or the hook is decreased such that the threads interlock at an edge and/or surface of the material. In both a lock stitch and a modified lock stitch the needle thread and the bobbin thread must enter at opposite sides of the material such as opposite sides of first dry carbon fiber sheet 200. In some cases, a modified lock stitch may provide for increased bonding strength of a material. In some cases, the stitching 304 extending through the first dry carbon fiber sheet 200 may include a stitching 304 style such as tufting. "Tufting" for the purposes of this disclosure is the process of stitching a material through a primary surface in the form of a loop. A tufting process may include inserting a thread through a first surface of a material, looped within the first material or an opposing surface of the material and back through the first surface of the material. In tufting, a loop of the thread is typically left on an opposing surface of the material. Tufting may be contrasted with a lock stitch or a modified lock stitch in that tufting requires only requires a single thread penetrating only one side of the material. In tufting the loops created by the thread are not interlocked and instead remain in place due to friction between the thread and the material. In some cases, stitching 304 may be partially inserted into first dry carbon fiber sheet 200 wherein stitching 304 is looped within first dry carbon fiber sheet 200 and returned to the surface. In some cases, stitching 304 may be completely inserted into first dry carbon fiber sheet 200 wherein stitching 304 is inserted through one surface and looped on an opposing surface prior to returning through the inserting surface. In some cases, stitching 304 may extend through first dry carbon fiber sheet 200 using a tufting needle wherein the tufting needle is configured to insert stitching 304 through an inserting surface and loop the stitching 304 within first dry carbon fiber sheet 200. In some cases, stitching 304 may be inserted orthogonal to a surface of first dry carbon fiber sheet 200. In some cases, stitching 304 may be inserted non-parallel to first dry carbon fiber sheet 200. In some cases, stitching 304 may be inserted into first dry carbon fiber sheet 200 at a 45-degree angle.

With continued reference to FIG. 3, first composite part 300 further includes a resin matrix 308, wherein the stitching 304 and the first dry carbon fiber sheet 200 are embedded within the resin matrix 308 to create a single unified structure. "Resin" as described in this disclosure is a compound consisting of a non-crystalline or viscous liquid substance. Resin may be reacted with a curing agent or a hardener in order to create a solid material. In some embodiments, resin may include vinylester resins, epoxy resins or any other lightweight resins with durability suitable for aircraft. "Matrix" for the purposes of this disclosure is a material in which a reinforcement material is embedded into such that the matrix binds the reinforcement material and provides the reinforcement material with a defined shape. "Resin matrix" for the purposes of this disclosure is a containing resin wherein reinforcement material is embedded into the resin. In some cases, resin matrix 308 may include a resin wherein a reinforcement material such as the first dry carbon fiber cloth, along with the stitching 304 are embedded into resin matrix 308 to bind the first dry carbon fiber cloth and the stitching 304 to provide a shape. Resin matrix 308 may include any resin and/or resin matrix 308 as described within this disclosure. Resin may be a liquid that is poured and used to create a shape. Resin may then be cured to maintain a desired shape. Resin may be poured over first dry carbon sheet such that first dry carbon fiber sheet 200 along with the stitching 304 is embedded into a layer of resin. Resin may provide for reinforcement of first dry carbon fiber sheet 200 and ensure that carbon fibers within first dry carbon fiber sheet 200 do not change orientation. In some cases, first dry carbon fiber sheet 200, stitching 304, and resin matrix 308 may be combined to create a single unified structure. "A single unified structure" for the purposes of this disclosure is a part and/or component having multiple elements that are bound together to create a single product. First composite part 300 may contain a single unified structure wherein elements of first composite part 300 cannot be easily interchanged and/or modified. In some cases, single unified structure may include a product wherein each element cannot be removed without destroying or damaging the structure. In some cases, single unified structure may include a product that contains multiple parts that all move in tandem with one another. In some cases, single unified structure may include a part wherein each element is dependent on at least another element within the part. In some cases, first composite part 300 may be a single unified structure wherein first composite part 300 is molded such that elements within the resin matrix 308 are bound together. In this embodiment, resin matrix 308 may be cured such that stitching 304, and first dry carbon fiber sheet 200 are bound within the resin matrix 308. In some cases, first composite part 300 may include a molded part, wherein the molded part includes a composite created within a mold. In some cases, first dry carbon fiber sheet 200, resin matrix 308 and stitching 304 may be placed within a mold and cured in order to create a molded part and/or first composite part 300.

With continued reference to FIG. 3, the resin matrix 308 may be cured through a molding process. "Molding" as described herein refers to the formation of an object. In some embodiments, molding may include formation of an object using malleable material. Molding may include pouring resin into a mold to create a part. Molding may further include pouring resin into a mold and curing the mold. Molding may include a Resin Transfer Molding. Resin Transfer Molding as described is a closed molding process wherein resin is injected into a mold having a dry composite, first dry carbon fiber sheet 200, and clamped together. Continuing, a vacuum is then applied to the mold to remove any air and ensure that the dry composite has been properly infused. In some embodiments, molding may include compression molding. Compression molding as described herein is process in which a molding material such as resin is placed into an open mold and compressed from an open end of the mold. In some embodiments, molding may include a Vacuum Infusion Process (VIP). In some cases, first dry carbon fiber sheet 200 and stitching 304 may be embedded into resin matrix 308 using VIP. "Vacuum infusion process," as described herein, refers to a closed molding process in which resin is infused into a mold using a vacuum to draw the resin into the mold. VIP includes placing a dry composite, such as first dry carbon fiber sheet 200 and stitching 304, into a mold and infusing the sheets with a resin. In a vacuum infusion process, air pockets and any other voids are removed, and resin is drawn into the mold. In a vacuum infusion process, the dry composite is first placed into a mold and the resin is drawn into a mold such that the resin takes the form of the mold. In a vacuum infusion process, the dry composite may be compacted using a vacuum before the resin is drawn in. A vacuum infusion process may be preferred in materials that require a higher concentration of dry composites or reinforcement material in comparison to resin. In a vacuum infusion process voids may be minimized as air pockets are sucked out prior to the resin being drawn into the laminate.

With continued reference to FIG. 3, first composite part 300 may include a second dry carbon fiber sheet. Second dry carbon fiber sheet may be consistent with first dry carbon fiber sheet 200. In some cases, second dry carbon fiber sheet may be consistent with any carbon fiber sheet described herein. In some cases, second dry carbon fiber sheet may be substantially similar to first dry carbon fiber sheet 200. In some cases, aspects of second dry carbon fiber sheet may differ from first dry carbon fiber sheet 200. For example, second dry carbon fiber sheet may contain more layers than first dry carbon fiber sheet 200. In another non-limiting example, second dry carbon fiber sheet may contain a differing layup orientation as first dry carbon fiber sheet 200. "Layup orientation," for the purposes of this disclosure, refers to the positioning of one or more layers of a carbon fiber sheet. For example, a particular carbon fiber sheet may contain a unidirectional layup orientation wherein every layer within the carbon fiber sheet is situated in the same direction. A layup orientation may further include a bidirectional layup orientation wherein layers within the carbon fiber sheet are situated in one of two directions. Layup orientations may further include quasi-isotropic layups, symmetrical layups, unsymmetrical layups and the like. In some cases, second dry carbon fiber sheet may contain similar features as first dry carbon fiber sheet 200 described above. In some cases, second dry carbon fiber sheet may contain differing functionalities as first dry carbon fiber sheet 200. For example, second dry carbon fiber sheet may be configured for a stringer of an aircraft wherein first dry carbon fiber sheet 200 may be configured for an outer mold line of an aircraft. In some cases, second dry carbon fiber sheet may contain a similar functionality as first dry carbon fiber sheet 200. For example, first dry carbon fiber sheet 200 may be configured as a first panel, or a portion of a first panel, of an outer mold line of BWB aircraft 100, wherein second dry carbon fiber sheet may be configured for a second panel or a second portion of the first panel, of an outer mold line of BWB aircraft 100. In some cases, BWB aircraft 100 may contain multiple dry carbon fiber sheets having similar properties as first dry carbon fiber sheet 200 wherein each dry carbon fiber sheet may serve a similar or differing purpose.

With continued reference to FIG. 3, second dry carbon fiber sheet may be oriented relative to first dry carbon fiber sheet 200. In some cases, second dry carbon fiber sheet may be oriented relative to first dry carbon fiber sheet 200 wherein a width of composite part may include the sum of first dry carbon fiber sheet 200 and second dry carbon fiber sheet. In some cases, second dry carbon fiber sheet may be disposed upon first dry carbon fiber sheet 200 such that the thickness of first composite part 300 includes the sum of the thicknesses of first dry carbon fiber sheet 200 and second dry carbon fiber sheet. In some cases, second dry carbon fiber sheet may be stitched to first dry carbon fiber sheet 200 using any stitching 304 method as described in this disclosure. In some cases, second dry carbon fiber sheet may be embedded within resin matrix 308, wherein first composite part 300 contain a single unified structure. In some cases, multiple carbon fiber sheets consistent with first dry carbon fiber sheet 200 and/or second dry carbon fiber sheet may be stacked and/or oriented relative to one another wherein the stacking of the sheets may increase the overall thickness of first composite and the orienting of the dry carbon fiber sheets may increase the width of first composite part 300.

With continued reference to FIG. 3, first composite part 300 may include an adhesive configured to bind the first dry carbon fiber sheet 200 and the second dry carbon fiber sheet. "Adhesive," for the purposes of this disclosure, is any material that may be used to bind two or more materials together such that they are fixedly attached. Adhesive may include a glue or a bonding agent wherein first dry carbon fiber sheet 200 is bonded to second dry carbon fiber sheet. Adhesive may further include cyanoacrylate, single component epoxies, polyurethane adhesives, structural acrylics, two component epoxies, structural film adhesives, and the like. Adhesive may further include a stitching 304 wherein the stitching 304 is configured to bind portions of first dry carbon fiber sheet 200 and portions of second dry carbon fiber sheet together. Stitching 304 may be stitched to first dry carbon fiber sheet 200 and second dry carbon fiber sheet using any stitching 304 method as described within this disclosure. In some cases, adhesive may include one or more carbon fiber strands that are woven between first dry carbon fiber sheet 200 and second dry carbon fiber sheet thereby creating one large carbon fiber sheet. In some cases, adhesive may include resin wherein first dry carbon fiber sheet 200 and second dry carbon fiber sheet may be placed in a resin matrix 308 and cured such that first dry carbon fiber sheet 200 and second dry carbon fiber sheet are bound together within a resin matrix 308.

With continued reference to FIG. 3, first composite part 300 may include multiple dry carbon fiber sheets consistent with first dry carbon fiber sheet 200 and/or second dry carbon fiber sheet wherein each dry carbon fiber sheet may be representative of a particular element of an aircraft structure component. For example, first composite part 300 may include an aircraft wherein the wing increase in in chord from a winglet towards the main body. In this embodiment, each dry carbon fiber sheet may include differing width and lengths, wherein the combination of the dry carbon fiber sheets may be representative of a wing of an aircraft. In some cases, dry carbon fiber sheets may be manufactured with differing sizes wherein combinations of the differing sizes may be used to create first composite part 300.

Referring back to FIG. 1, first composite part 116 may include a portion of blended wing body of BWB aircraft 100. In some cases, first composite part 116 and/or first dry carbon fiber sheet 200 may include structural components of BWB aircraft 100. Structural components may include struts, beams, formers, stringers, longerons, interstitials, ribs, structural skin, doublers, straps, spars, or panels, to name a few. Structural components may also include pillars. In some cases, for the purpose of aircraft cockpits comprising windows/windshields, pillars may include vertical or near vertical supports around a window configured to provide extra stability around weak points in a vehicle's structure, such as an opening where a window is installed.

With continued reference to FIG. 1, first composite part 116 may be part of an outer 208 mold line 120 of BWB aircraft 100. "Outer mold line" for the purposes of this disclosure is an outer surface of an aircraft. In some cases, the outer mold line 120 may include an outer skin of the aircraft. In some cases, the outer mold line 120 may include an outer surface of an aircraft fuselage, wing, nose, and the like. In some cases, the outer mold line 120 defines the external surface of an aircraft. In some cases, BWB aircraft 100 may contain one or more first composite parts 116 wherein the one or more first composite parts 116 define a portion of the outer mold line 120 of BWB aircraft 100. In some cases, each first composite part 116 may be representative of a panel on the outer mold line 120 of BWB aircraft 100. In some cases, outer mold line 120 may contain multiple first composite parts 116 that are bound together, wherein each first composite part 116 may be representative of a portion of an overall aircraft component. For example, one first composite part 116 may include a first panel on a fuselage whereas another first composite part 116 may include a second panel on the fuselage wherein the first panel and the second panel are substantially similar. In some cases, first composite part 116 may include a portion of a bulkhead of BWB aircraft 100. In some cases, first composite part 116 may include a portion of a forward pressure bulkhead of BWB aircraft 100 and/or an aft pressure bulkhead of BWB aircraft 100. In some cases, BWB aircraft 100 may include a structural element within the fuselage configured to contain the pressure within BWB aircraft 100. In some cases, structural element may extend vertically form a lower surface of the fuselage to an upper surface of fuselage. In some cases, first composite part 116 may include structural element.

With continued reference to FIG. 1, BWB aircraft 100 may contain ribs running along a fuselage of the aircraft. "Ribs" for the purposes of this disclosure are components of an aircraft configured to provide a shape and structural support for the aircraft. In some cases, ribs may be located at intervals along an aircraft to provide structural support along the aircraft. In some cases, ribs may act as a structural support for BWB aircraft 100. In some cases, ribs may be situated within and/or along a passenger cabin within BWB aircraft 100. In some cases, ribs may provide a tension connection between upper and lower skins of BWB aircraft 100. In some cases, ribs may be fastened to stringers on an upper and lower surface of BWB aircraft 100. In some cases, Ribs may be composed of more than one 'I' beams running along a length of the aircraft. In some cases, Ribs may be positioned between cabin bays within passenger cabin. In some cases, BWB aircraft 100 may contain a passenger cabin having multiple cabin bays, wherein each cabin bay is separated by a wall and/or a partition. The wall or partition may include ribs. Alternatively, the ribs may be positioned within walls or partitions. In some cases, BWB aircraft 100 may contain 4 columns wherein each column includes more than one ribs positioned along a length of the passenger cabin. In some cases, each column of ribs may act as a partition between two or more cabin bays. In some cases, first composite part 116 may include a portion of the ribs. In some cases, BWB aircraft 100 may include one or more ribs wherein first composite part 116 includes a portion of one or more ribs.

With continued reference to FIG. 1, BWB aircraft 100 may include a second composite part 124. Second composite part 124 may be consistent with first composite part 116. In some cases, second composite part 124 may be consistent with any composite parts described herein. In some cases, second composite part 124 fiber sheet may be substantially similar to first dry carbon fiber sheet 200. In some cases, aspects of second composite part 124 may differ from aspects of first composite part 116. For example, second composite part 124 may take the form of a differing shape as first composite part 116. In some cases, second composite part 124 may differ in size, shape, thickness and/or functionality. For example, second composite part 124 may include a larger width and/or a larger thickness. In some cases, second composite part 124 may contain similar features as first composite part 116, but differing functionalities. For example, first composite part 116 may include a portion of an outer skin surface of BWB aircraft 100 whereas second composite part 124 may include a portion of ribs, stringers and the like of BWB aircraft 100.

With continued reference to FIG. 1, in some cases, first composite part 116 may include a frame of the BWB aircraft 100 and second composite part 124 may include one or more stringers of BWB aircraft 100. A "frame," for the purposes of this disclosure, is the primary load bearing structure of an aircraft that provides the shape of the aircraft. In some cases, the skin of the aircraft may be adhered to the aircraft frame. In some cases, the frame may define portions of the aircraft such as the main body, wings, nose and the like. In some cases, first composite part 116 may be attached to second composite part 124, through adhesives and the like as described in this disclosure. In some cases, first composite part 116 may be stitched to second composite part 124. In some cases, first composite part 116 may contain an opening and/or a slot wherein the slot is configured to receive second composite part 124. In some cases, second composite part 124 may be adhered to first composite part 116 through stitching wherein a stitching material may bind second composite part 124 to first composite part 116. In some cases, first composite part 116 may include a portion of main body of BWB aircraft 100 and second composite part 124 may include a portion of the nose of BWB aircraft 100. In some cases, first composite part 116 and second composite part 124 may be adhered together such that components of aircraft structured are fixedly attached together.

Figure 4:
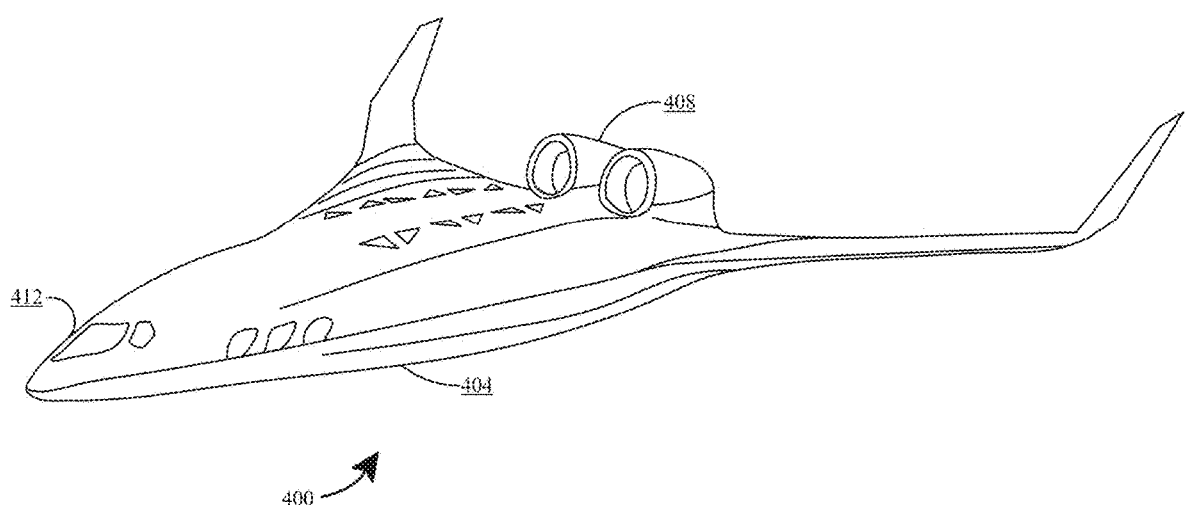
FIG. 4 is a schematic of an exemplary blended wing aircraft.

Referring to FIG. 4, an exemplary blended wing aircraft 400 is illustrated. Aircraft 400 may include a blended wing body 404. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 404 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 404 design may or may not be tailless. One potential advantage of a BWB 404 may be to reduce wetted area and any accompanying drag associated with a conventional wing-body junction. In some cases, a BWB 404 may also have a wide airfoil-shaped body, allowing entire aircraft to generate lift and thereby facilitate reduction in size and/or drag of wings. In some cases, a BWB 404 may be understood as a hybrid shape that resembles a flying wing, but also incorporates features from conventional aircraft. In some cases, this combination may offer several advantages over conventional tube-and-wing airframes. In some cases, a BWB airframe 404 may help to increase fuel economy and create larger payload (cargo or passenger) volumes within the BWB. BWB 404 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 4, BWB 404 of aircraft 400 may include a nose portion. A "nose portion," for the purposes of this disclosure, refers to any portion of aircraft 400 forward of the aircraft's fuselage 416. Nose portion may include a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may include a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 4, BWB 404 may include at least a structural component of aircraft 400. Structural components may provide physical stability during an entirety of an aircraft's 400 flight envelope, while on ground, and during normal operation Structural components may include struts, beams, formers, stringers, longerons, interstitials, ribs, structural skin, doublers, straps, spars, or panels, to name a few. Structural components may also include pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 400 structure, they may be so named A, B, C, and so on named from nose to tail. Pillars, like any structural element, may be disposed a distance away from each other, along an exterior of aircraft 400 and BWB 404. Depending on manufacturing method of BWB 404, pillars may be integral to frame and skin, made entirely of internal framing, or alternatively, may be only integral to structural skin elements. Structural skin will be discussed in greater detail below.

With continued reference to FIG. 4, BWB 404 may include a plurality of materials, alone or in combination, in its construction. At least a BWB 404, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 404 may include aluminum tubing mechanically coupled in various and orientations. Mechanical fastening of aluminum members (whether pure aluminum or alloys) may include temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 404 may additionally or alternatively use wood or another suitably strong yet light material for an internal structure.

With continued reference to FIG. 4, aircraft 400 may include monocoque or semi-monocoque construction. BWB 404 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each include a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 4, BWB 404 may include at least a fuselage. A "fuselage," for the purposes of this disclosure, refers to a main body of an aircraft 400, or in other words, an entirety of the aircraft 400 except for nose, wings, empennage, nacelles, and control surfaces. In some cases, fuselage may contains an aircraft's payload. At least a fuselage may include structural components that physically support a shape and structure of an aircraft 400. Structural components may take a plurality of forms, alone or in combination with other types. Structural components vary depending on construction type of aircraft 400 and specifically, fuselage. A fuselage 412 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can include steel tubes and/or wood beams. An aircraft skin may be layered over a body shape constructed by trusses. Aircraft skin may include a plurality of materials such as plywood sheets, aluminum, fiberglass, and/or carbon fiber.

With continued reference to FIG. 4, in embodiments, at least a fuselage may include geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 400. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers includes a same shape as aircraft 400 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 4, according to some embodiments, a fuselage can include monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 4, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which are may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction," vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may include aluminum, aluminum alloys, graphite epoxy composite, steel alloys, titanium, or an undisclosed material alone or in combination.

With continued reference to FIG. 4, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 4, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 4, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 404. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in²) or Pascals (Pa). In semi-monocoque construction stressed skin bears part of aerodynamic loads and additionally imparts force on an underlying structure of stringers and formers.

With continued reference to FIG. 4, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 400 is in its level flight orientation or sitting on ground. A post may act similarly to stringer in that it is configured to support axial loads in compression due to a load being applied parallel to its axis due to, for example, a heavy object being placed on a floor of aircraft 400. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 4, aircraft 400 may include at least a flight component 408. A flight component 408 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 400 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 400. In some embodiments, at least a flight component 408 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 4, for the purposes of this disclosure, "torque," is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 4, at least a flight component may be one or more devices configured to affect aircraft's 400 attitude. "Attitude," for the purposes of this disclosure, is the relative orientation of a body, in this case aircraft 400, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 400. A plurality of attitude datums may indicate one or more measurements relative to an aircraft's pitch, roll, yaw, or throttle compared to a relative starting point. One or more sensors may measure or detect an aircraft's 400 attitude and establish one or more attitude datums. An "attitude datum," for the purposes of this disclosure, refers to at least an element of data identifying an attitude of an aircraft 400.

With continued reference to FIG. 4, in some cases, aircraft 400 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 4, in some cases, aircraft 400 may include at least a pilot control. As used in this disclosure, a "pilot control," is an interface device that allows an operator, human or machine, to control a flight component of an aircraft. Pilot control may be communicatively connected to any other component presented in aircraft 400, the communicative connection may include redundant connections configured to safeguard against single-point failure. In some cases, a plurality of attitude datums may indicate a pilot's instruction to change heading and/or trim of an aircraft 400. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch," for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down," when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw," for the purposes of this disclosure, refers to an aircraft's turn angle, when an aircraft rotates about an imaginary vertical axis intersecting center of earth and aircraft 400. "Throttle," for the purposes of this disclosure, refers to an aircraft outputting an amount of thrust from a propulsor. In context of a pilot input, throttle may refer to a pilot's input to increase or decrease thrust produced by at least a propulsor. Flight components 408 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 4, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 408. At least a flight component 408 may include any propulsor as described herein. In embodiment, at least a flight component 408 may include an electric motor, a propeller, a jet engine, a paddle wheel, a rotor, turbine, or any other mechanism configured to manipulate a fluid medium to propel an aircraft as described herein, an embodiment of at least a sensor may include or be included in, a sensor suite. The herein disclosed system and method may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 4, at least a sensor may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat," for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell.

With continued reference to FIG. 4, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor," for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 4, at least a flight component 408 may include wings, empennages, nacelles, control surfaces, fuselages, and landing gear, among others, to name a few. In embodiments, an empennage may be disposed at the aftmost point of an aircraft body 404. Empennage may include a tail of aircraft 400, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 400 is flying. Manipulation of these empennage control surfaces may, in part, change an aircraft's heading in pitch, roll, and yaw. Wings may include structures which include airfoils configured to create a pressure differential resulting in lift. Wings are generally disposed on a left and right side of aircraft 400 symmetrically, at a point between nose and empennage. Wings may include a plurality of geometries in planform view, swept swing, tapered, variable wing, triangular, oblong, elliptical, square, among others. Wings may be blended into the body of the aircraft such as in a BWB 404 aircraft 400 where no strong delineation of body and wing exists. A wing's cross section geometry may include an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may include differing and/or similar cross-sectional geometries over its cord length, e.g. length from wing tip to where wing meets the aircraft's body. One or more wings may be symmetrical about an aircraft's longitudinal plane, which includes a longitudinal or roll axis reaching down a center of the aircraft through the nose and empennage, and the aircraft's yaw axis. In some cases, wings may include controls surfaces configured to be commanded by a pilot and/or autopilot to change a wing's geometry and therefore its interaction with a fluid medium. Flight component 408 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 408 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 400. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases, increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e, toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 400 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 4, aircraft 400 may include an energy source. Energy source may include any device providing energy to at least a flight component 408, for example may at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 4, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels., synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 404 of aircraft 400, for example without limitation within a wing portion 412 of blended wing body 408. Aviation fuels may include petroleum-based fuels, or petroleum and synthetic fuel blends, used to power aircraft 400. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 400. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 4, modular aircraft 400 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 4, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 4 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked," or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 4, aircraft 400 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 4, aircraft 400 may include multiple flight component 408 sub-systems, each of which may have a separate energy source. For instance, and without limitation, one or more flight components 408 may have a dedicated energy source. Alternatively, or additionally, a plurality of energy sources may each provide power to two or more flight components 408, such as, without limitation, a "fore" energy source providing power to flight components located toward a front of an aircraft 400, while an "aft" energy source provides power to flight components located toward a rear of the aircraft 400. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 408. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 4, aircraft 400 may include a flight component 408 that includes at least a nacelle 408. For the purposes of this disclosure, a "nacelle" is a streamlined body housing, which is sized according to that which is houses, such as without limitation an engine, a fuel store, or a flight component. When attached by a pylon entirely outside an airframe 404 a nacelle may sometimes be referred to as a pod, in which case an engine within the nacelle may be referred to as a podded engine. In some cases, an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 400 partially or wholly enveloped by an outer mold line of the aircraft 400. At least a nacelle may be designed to be streamlined. At least a nacelle may be asymmetrical about a plane comprising the longitudinal axis of the engine and the yaw axis of modular aircraft 400.

With continued reference to FIG. 4, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 4, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 4, in nonlimiting embodiments, at least a flight component 408 may include an airbreathing engine such as a jet engine, turbojet engine, turboshaft engine, ramjet engine, scramjet engine, hybrid propulsion system, turbofan engine, or the like. At least a flight component 408 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may includes heat engine in which combustion of fuel occurs with an oxidizer (usually air) in a combustion chamber that includes a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 4, an aircraft 400 may include a flight controller. As used in this disclosure, a "flight controller" is a device that generates signals for controlling at least a flight component 408 of an aircraft 400. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 4, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 400 and/or computing device.

With continued reference to FIG. 4, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
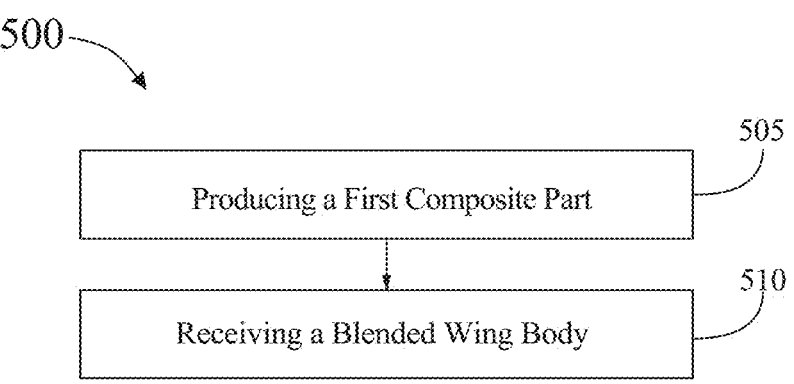
FIG. 5 is a block diagram of an exemplary method of manufacture of an aircraft having first composite part and a blended wing body.

Referring now to FIG. 5, a method 500 of manufacture of a blended wing body aircraft is described. At step 505, method 500 includes producing a first composite part. Producing first composite part includes placing a first layer having a first plurality of dry carbon fibers in a first direction and placing a second layer comprising a second plurality of dry carbon fibers on top of the first layer and in a second direction. Producing first composite part further includes binding the first dry carbon fiber sheet together with at least one stitching, wherein the at least one stitching extends through the first dry carbon fiber sheet. Producing first composite part further includes molding, using a resin, the first dry carbon fiber sheet, wherein the stitching and the first dry carbon fiber sheet are embedded within the resin to create a single unified structure. In some cases, wherein the first composite part is part of an outer mold line of the blended wing body aircraft. In some cases, molding, using a resin, the first dry carbon fiber sheet includes molding using a vacuum infusion process. In some cases, a first dry carbon fiber of the first plurality of dry carbon fibers is situated non-parallel to a second dry carbon fiber of the first plurality of dry carbon fibers. In some cases, the first dry carbon fiber sheet is bound with a modified lock stitch. In some cases, binding the first dry carbon fiber sheet together with at least one stitching includes tufting the at least one stitching to the first dry carbon fiber sheet. In some cases, method 500 further includes producing a second composite part, orienting the second composite part relative to the first composite part, and/or adhering the first composite part to the second composite part. This may be implemented as described with reference to FIGS. 1-5 without limitations.

With continued reference to FIG. 5, at step 510, method 500 includes receiving a blended wing body, wherein the blended wing body has no clear demarcation along a leading edge of the blended wing body from a wing to a nose of the blended wing body, and wherein the first composite part includes a portion of the blended wing body. In some cases, the first composite part includes a frame of the blended wing body aircraft, and the second composite part includes a stringer of the blended wing body aircraft. In some cases, the first composite part includes a portion of the main body of the blended wing body aircraft and the second composite part includes a portion of the nose of the blended wing body aircraft. In some cases, method 500 further includes orienting one or more ribs along the main body of the blended wing body aircraft, wherein the first composite part includes a portion of the one or more ribs. This may be implemented as described with reference to FIGS. 1-5 without limitations.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
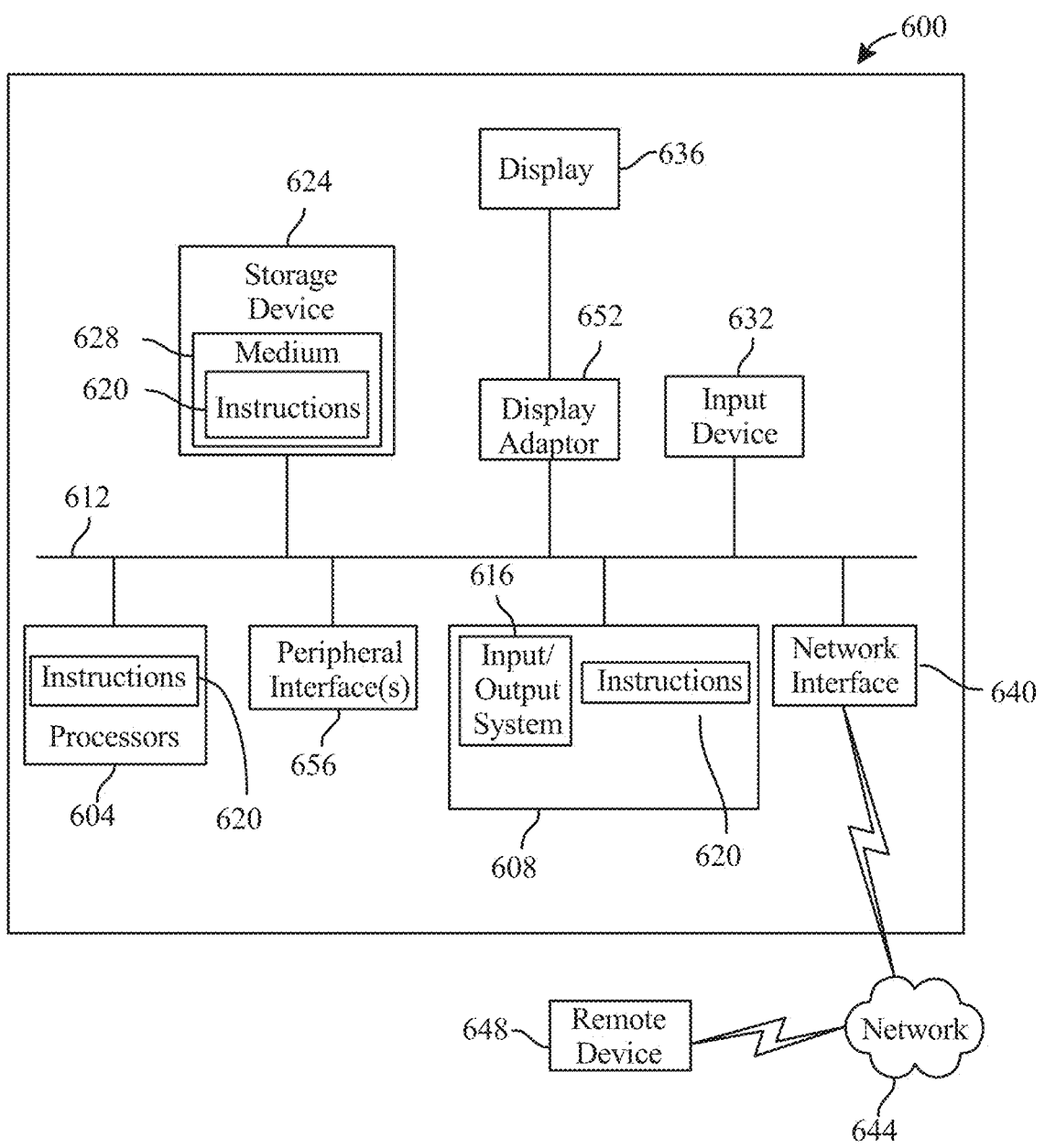
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A blended wing body aircraft comprising:
a first composite part comprising:
a first dry carbon fiber sheet having a first width greater than 3 inches, the first dry carbon fiber sheet comprising:
a first layer comprising a first plurality of dry carbon fibers in a first orientation, wherein the first plurality of dry carbon fibers comprises multiple layers laid onto one another to form the first layer with a first overall thickness, wherein the first orientation comprises a bidirectional layup orientation; and
a second layer comprising a second plurality of dry carbon fibers comprising a differing material than the first layer positioned in a second orientation offset from the first orientation, wherein the second layer is disposed on top of the first layer in the second orientation and has a second overall thickness differing from the first overall thickness, wherein the second orientation comprises a unidirectional layup orientation, wherein:
the first dry carbon fiber sheet includes a first portion of the aircraft;
at least one stitching extending through the first dry carbon fiber sheet, wherein the at least one stitching is configured to bind the first dry carbon fiber sheet together and wherein the first plurality of dry carbon fibers and the second plurality of dry carbon fibers are in direct contact with each other;

a second dry carbon fiber sheet stitched to the first dry carbon fiber sheet and comprising a second portion of the aircraft; wherein the second dry carbon fiber sheet comprises a second width; and
a single resin matrix, wherein the at least one stitching, the first dry carbon fiber sheet and the second dry carbon fiber sheet are embedded within the single resin matrix to create a single unified structure;
wherein the first composite part has a third width; and the third width comprises a sum of the first width and the second width; and
a blended wing body, wherein the blended wing body has no clear demarcation along a leading edge of the blended wing body aircraft from a wing to a nose of the blended wing body, and wherein the first composite part comprises a portion of the blended wing body.

2. The blended wing body aircraft of claim 1, wherein the first composite part is part of an outer mold line of the blended wing body aircraft.

3. The blended wing body aircraft of claim 1, wherein the at least one stitching and the first dry carbon fiber sheet are embedded within the single resin matrix using a vacuum infusion process.

4. The blended wing body aircraft of claim 1, wherein a first dry carbon fiber of the first plurality of dry carbon fibers is situated non-parallel to a second dry carbon fiber of the first plurality of dry carbon fibers.

5. The blended wing body aircraft of claim 1, wherein the at least one stitching extending through the first dry carbon fiber sheet comprises a modified lock stitch.

6. The blended wing body aircraft of claim 1, wherein the at least one stitching comprises tufting.

7. The blended wing body aircraft of claim 1, wherein the blended wing body aircraft further comprises:
a second composite part orientated relative to the first composite part; and
an adhesive, wherein the adhesive is configured to bind the first composite part and the second composite part together.

8. The blended wing body aircraft of claim 7, wherein the first composite part comprises a frame of the blended wing body aircraft and the second composite part comprises a stringer of the blended wing body aircraft.

9. The blended wing body aircraft of claim 7, wherein the first composite part comprises a portion of a main body of the blended wing body aircraft and the second composite part comprises a portion of the nose of the blended wing body aircraft.

10. The blended wing body aircraft of claim 1, further comprising one or more ribs running along a main body of the blended wing body aircraft, wherein the first composite part comprises a portion of the one or more ribs.

11. A method of manufacture of a blended wing body aircraft, the method comprising:
producing a first composite part comprising:
forming a first dry carbon fiber sheet having a first width comprising:
placing a first layer comprising a first plurality of dry carbon fibers in a first orientation, wherein the first plurality of dry carbon fibers comprises multiple layers laid onto one another to form the first layer with a first overall thickness, wherein the first orientation comprises a bidirectional layup orientation; and
placing a second layer comprising a second plurality of dry carbon fibers comprising a differing material than the first layer positioned in a second orientation offset from the first orientation, wherein the second layer is disposed on top of the first layer in the second orientation and has a second overall thickness differing from the first overall thickness, wherein the second orientation comprises a unidirectional layup orientation, wherein:

the first dry carbon fiber sheet includes a first portion of the aircraft;

binding the first dry carbon fiber sheet together with at least one stitching, wherein the at least one stitching extends through the first dry carbon fiber sheet and wherein the first plurality of dry carbon fibers and the second plurality of dry carbon fibers are in direct contact with each other;

stitching a second dry carbon fiber sheet stitched to the first dry carbon fiber sheet, wherein the second dry carbon fiber sheet comprises a second portion of the aircraft; wherein the second dry carbon fiber sheet comprises a second width; and molding, using a resin, the first dry carbon fiber sheet and the second dry carbon fiber sheet, wherein the at least one stitching, the first dry carbon fiber sheet and the second dry carbon fiber sheet are embedded within the resin to create a single unified structure; wherein the first composite part has a third width; and the third width comprises a sum of the first width and the second width; and receiving a blended wing body, wherein the blended wing body has no clear demarcation along a leading edge of the blended wing body aircraft from a wing to a nose of the blended wing body, and wherein the first composite part comprises a portion of the blended wing body.

12. The method of claim 11, wherein the first composite part is part of an outer mold line of the blended wing body aircraft.

13. The method of claim 11, wherein molding, using the resin, the first dry carbon fiber sheet and the second dry carbon fiber sheet comprises molding the first dry carbon fiber sheet using a vacuum infusion process.

14. The method of claim 11, wherein a first dry carbon fiber of the first plurality of dry carbon fibers is situated non-parallel to a second dry carbon fiber of the first plurality of dry carbon fibers.

15. The method of claim 11, wherein binding the first dry carbon fiber sheet together comprises binding the first dry carbon fiber sheet together with a with a modified lock stitch.

16. The method of claim 11, wherein binding the first dry carbon fiber sheet together with the at least one stitching comprises tufting the at least one stitching to the first dry carbon fiber sheet.

17. The method of claim 11, further comprising:

producing a second composite part;

orienting the second composite part relative to the first composite part; and adhering the first composite part to the second composite part.

18. The method of claim 17, wherein the first composite part comprises a frame of the blended wing body aircraft and the second composite part comprises a stringer of the blended wing body aircraft.

19. The method of claim 17, wherein the first composite part comprises a portion of a main body of the blended wing body aircraft and the second composite part comprises a portion of the nose of the blended wing body aircraft.

20. The method of claim 11, further comprising orienting one or more ribs along a main body of the blended wing body aircraft, wherein the first composite part comprises a portion of the one or more ribs.

\* \* \* \* \*